March 24, 1936. N. P. HARSHBERGER Re. 19,903

ROOFING MATERIAL

Original Filed May 21, 1928 3 Sheets-Sheet 1

INVENTOR
Norman P. Harshberger
BY
Fred. W. Dodson
ATTORNEY

March 24, 1936. N. P. HARSHBERGER Re. 19,903

ROOFING MATERIAL

Original Filed May 21, 1928 3 Sheets-Sheet 2

INVENTOR
Norman P. Harshberger
BY
Fred. W. Dodson
ATTORNEY

March 24, 1936. N. P. HARSHBERGER Re. 19,903

ROOFING MATERIAL

Original Filed May 21, 1928 3 Sheets-Sheet 3

INVENTOR
Norman P. Harshberger
BY
Fred. W. Dodson
ATTORNEY

Reissued Mar. 24, 1936

Re. 19,903

UNITED STATES PATENT OFFICE 19,903

ROOFING MATERIAL

Norman P. Harshberger, Scarsdale, N. Y., assignor to Bakelite Building Products Co. Inc., New York, N. Y., a corporation of Delaware Original No. 1,900,861, dated March 7, 1933, Serial No. 279,402, May 21, 1928. Application for reissue February 11, 1935, Serial No. 6,088

19 Claims. (Cl. 108—7)

This invention relates to roofing material and, particularly, to strips of roofing material which have one edge serrated so as to provide a more pleasing appearance to the roof. One form of the serrations which I have illustrated in explaining my invention is that of a portion of a hexagon; but the invention relates equally as well to other figures which may be formed by these serrated edges.

The invention has for one of its objects a method of producing figures on the roof by a combination of the serrated edges of the shingling strip with definition lines or lines of demarcation on the strips which produce certain sides of figures and, at the same time, to reduce the amount of shingle material necessary to properly cover the roof and to produce the desired figures. Another object of the invention is to provide means for more conveniently laying the strips and for conveniently and effectively locking or clamping them down, so that the exposed edges will not be raised by warping, wind or otherwise. A further object of the invention is to provide strips with serrated edges which may be laid horizontally or at an inclination to the eaves of the roof.

Figure 1:
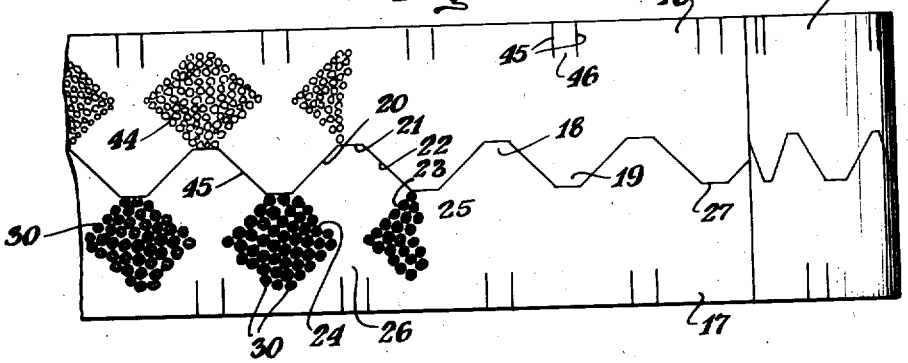
Figure 2:
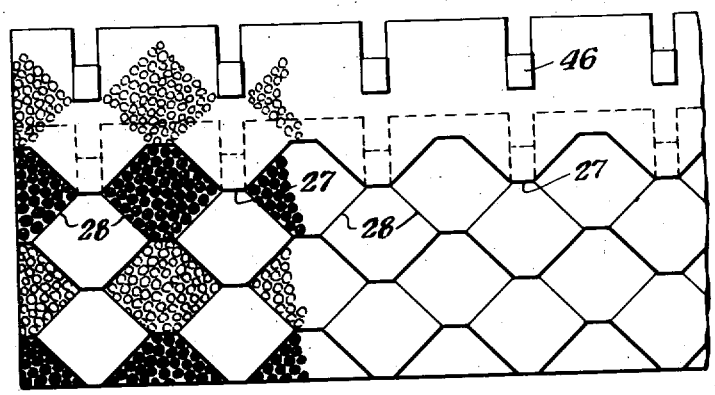
Figure 3:
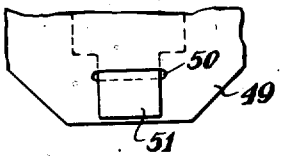
Figure 4:
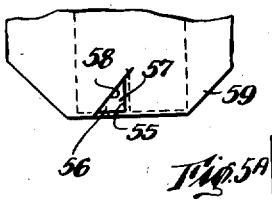
Figure 5:
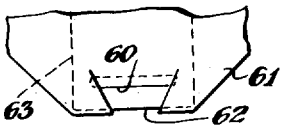
Figure 5A:
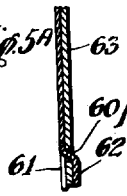
Figure 6:
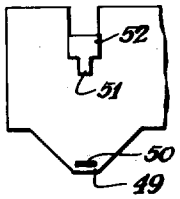
Figure 7:
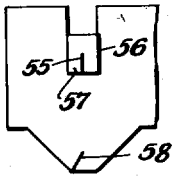
Figure 8:
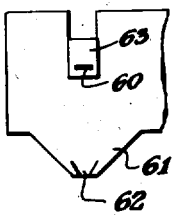
Figure 9:
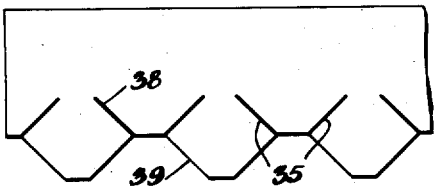
Figure 10:
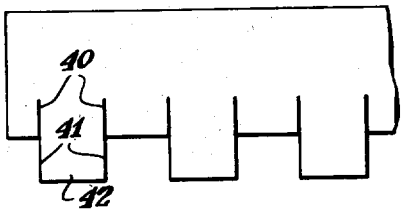
Figure 11:
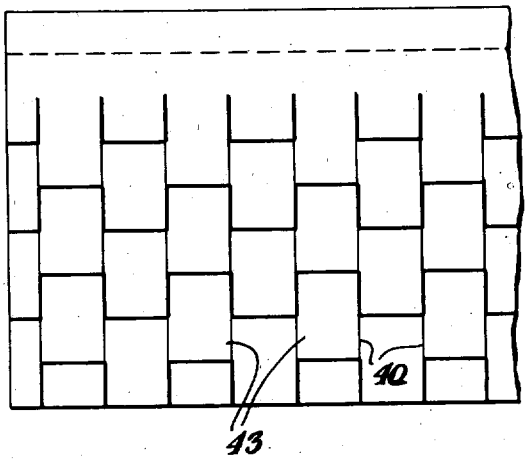
Figure 13:
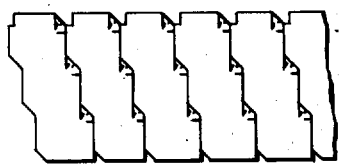
Figure 12:
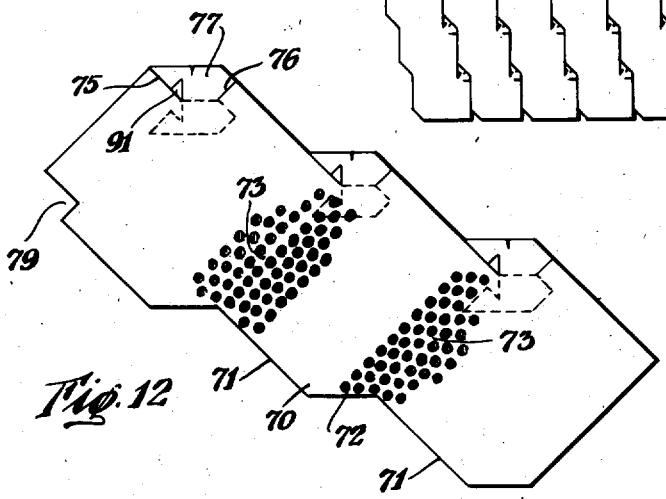
Figure 14:
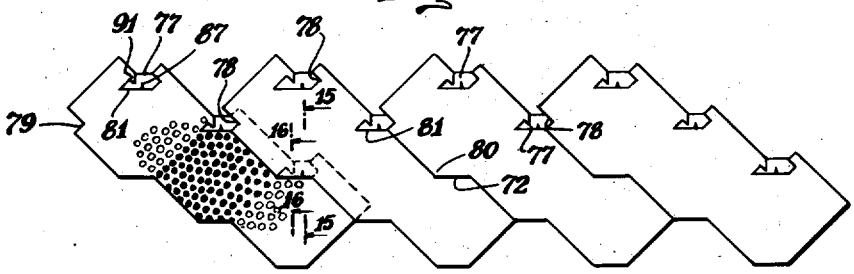
Figure 15:
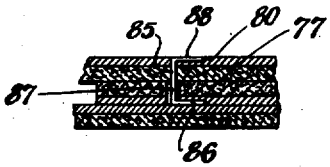
Figure 16:
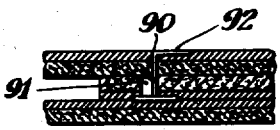

Of the accompanying drawings, Fig. 1 is a plan view of a roll of finished strips of shingle material which embody the features of my invention, with an end portion unrolled and flat; Fig. 2 is a plan view of these strips after they have been unrolled and as they appear when assembled on the roof; Figs. 3 to 8 show the manner in which the lap portions of the shingles may be locked down by the underlying shingles; Fig. 5A is an enlarged cross-section taken on line 5A—5A of Fig. 5; Figs. 9 and 10 show modified forms of shingles; Fig. 11 illustrates the manner of assembling on the roof the shingles of Fig. 10; Fig. 12 is a plan view of a modified shingle which is adapted to be inclined to the roof; Fig. 13 shows how these latter shingles may be cut; Fig. 14 shows these modified shingles as they appear when assembled on the roof; Figs. 15 and 16 illustrate methods of locking the rows and shingles together and preventing the exposed portions from warping or blowing upwardly, these figures being considered as taken along the respective lines 15—15 and 16—16 of Fig. 14.

While it is old to form figures on strips of roofing material by means of various colored minerals with which the roofing strips may be coated, or by other means of obtaining contrasting light effects, yet, my invention comprises not only this but a novel way of combining the contrasting light effects with the edges of the shingles themselves, so as to produce the figures sought, and also to reduce the roofing material required.

In this particular instance, I have illustrated a roll 15 which consists of two strips 16 and 17 of shingle material, which are substantially completed and ready to be laid on the roof. The unrolled portions of the strips are flat. These strips have a serrated edge consisting of the three-sided homologous projections 18 and recesses 19 of strip 17, which are formed on the strips in any suitable manner; and they also have on their surfaces contrasting light effects which form lines of demarcation 23 and 24. These lines, together, with the edges 20, 21 and 22 of the strips, form substantially hexagonal figures 25, with the exception of one side 26. When the strips are laid on the roof, the projecting edge 27 of the overlapping strip forms this sixth side of the hexagonal figures. As a consequence, two sides of the hexagonal figures are formed by lines of demarcation produced by the contrasting light effects, three of the sides are formed by the edge of the same shingle strip, and the sixth side is formed by the associated edge of the overlying strip and the complete hexagonal figures are thus clearly defined.

In Fig. 2, which illustrates the shingles assembled on a roof, the definition lines are made more definite by lines 28, and, if desired, such lines or stripes may be formed on the strips, either with or without the other contrasting light effects.

These contrasting light effects may be produced upon the strips in any suitable manner. In this instance, however, I prefer to produce them by means of groups of spots 30, the groups being formed so that the edges thereof will be suitable for associating with the edges of the strip, as indicated, to form the figure desired. These spots may be formed by means of cellulose material, such as duco, which readily dries and, hence, will not stick to the other side of the strips as they are wound up into rolls. Or these spots may be produced as raised figures by means of a bituminous mineral, or in any other suitable manner.

However, as stated, the contrasting light effects may be replaced by narrow stripes or lines, such as the lines 28 or the lines 35 of Fig. 9, and thus the figures desired will be formed when the shingles are assembled by means of these lines and the edges of the strips.

It will be understood that the exact length of the definition lines, and of the straight sections formed in the edges of the strips may be varied as desired and the angles formed by these edges or lines may also vary according to the particular figure which may be desired. For instance, the lines may be made as indicated by Fig. 10, in which the lines 40 are parallel with each other and are extensions of the edges 41 of the projection or lap 42 of the shingle strip. Thus, when the shingles are assembled, as indicated in Fig. 11, rectangular figures 43 will be formed, and the shape of these figures may be varied by varying the length of the lines 40 or the distance between them.

It will be noticed that, in each of these cases, the definition lines, no matter how formed, are parallel with the certain edges of the laps. In Figs. 1 and 9, the lines 38 are offset with reference to the edges 39 with which they are parallel; but, in case of Fig. 10, the lines 40 are not only parallel with but are extensions of the respective edges 41.

The shingle strips may be assembled and fastened to the roof in any suitable manner, but my invention also consists in the manner of laying or positioning the strips with reference to each other, so as to more clearly define certain edges of the figures. This consists, in part, in cutting slits 45 in the straight edges of the strips, so that lugs 46 are formed in the edges and, before the strips are assembled, these lugs 46 are turned back and downwardly onto the surface of the strips, as indicated in Fig. 2. These lugs are of such a length that, when the overlying strip has the outer edges of the projections registering with the free ends of the lugs, the strips will be properly positioned so as to form the figures desired. At the same time, the outer edge of the lug registering with the outer edge of the projection, doubles the thickness of the shingle material at this point and, thus, more clearly defines the lower edges 27 of the shingles and the upper sides of the figures to be produced, when the roof is viewed at a distance.

I also provide for locking the upper laps or projections to the lower strips of shingles when desired. This I provide for by the methods indicated by Figs. 3 to 8. One method consists in inserting in the laps 49 slits or slots 50 and inserting a tongue 51, attached to the outer end of the lug 52 of an underlying strip, through this slot 50, so as to prevent the lap 49 from bowing upwardly.

A modification of this method of locking down the laps consists in making a slit 55 in the outer end of the lug 56 and slipping the corner 57, formed by the slit, into a slot 58 formed in the edge of the lap 59 of the overlying strip. A further modification consists in providing a tongue 62 in the outer end of the lap 61 and passing this tongue 62 down through a slot 60 in the outer end of the lug 63 of the underlying strip.

In each of these cases, the strips of shingle material are not only easily properly positioned, but they are held very firmly in their relative positions so that there is no probability of displacement. Also, in each case, the outer edge of the lap and, thus, the lower edge of the figures formed, is more clearly defined. Also, in each of these cases, the lap is locked down.

Figs. 12 to 14 illustrate a modification of my strip shingle. This modified strip is adapted to be laid at an angle to the eaves but, at the same time, it is adapted to form hexagonal or other figures, one edge of which is parallel to the eaves. In this case, the strips are serrated on both sides, although the serrations on the upper edge of the shingle are not a necessary part of the invention.

The shingles, in this instance, may be cut from the sheets of shingle material as indicated in Fig. 13, and the contrasting surface portions formed thereon before or after the cutting of the sheets into shingle strips, the contrasting portions being formed in any suitable manner. Either the entire surfaces may be of contrasting appearance or merely stripes or lines of demarcation formed between surfaces, as is hereinabove described with reference to the stripes of Figs. 9 and 10.

In this case, I prefer to make the projections 70, which are to form the lap portions of the strips, with two unequal edges 71 and 72, the edge 72 being adapted to be the lower edge of the figure to be formed and to be parallel with the ridge and eaves of the roof. In this manner, each line of demarcation 73 formed on the surface is analogous to one of the exposed edges of the strip, while, in the case of Fig. 2, the lines of demarcation 28 are analogous to each other.

Also, in this case, the lines of demarcation which are effective in forming a figure independently of the edges of the strip are parallel with each other, while, in the former case, they were positioned angularly. In the former case also, the two lines converge as they extend inwardly from the edge of the strip, while in this latter case, they are parallel with each other. Partly because of these variations in the two types, the former may be more properly laid longitudinally with the roof and the latter at an inclination.

The means which I provide with this latter type of strip for emphasizing the exposed edge, for positioning the shingles, and for locking down the exposed edges, consists in forming, in the upper edge of the strips, slits 75 and 76, so that a lug 77 is formed and turned down on the shingle as indicated in Fig. 14. When so formed, the projecting corner 78 in the lug 77 of one shingle is positioned in the inwardly extending corner 79 of the adjacent overlying shingle, and the projection 80 of the overlying shingle is placed over the lug 77 of the underlying shingle, so that the edge 72 registers with the edge 81 of the lug 77. This completely positions the shingles with reference to each other and gives a double edge at this lower line of the figure, thus emphasizing the figure and the exposed edge.

In order to lock down the exposed corner or lap 80, any suitable means may be taken. I prefer to provide a metallic clip 85, having an angular portion 86 at one end and in the lug 77 I provide a slit 87. The clip 85 is positioned with the shank of the clip in the slit 87 and the portion 86 beneath the lug 77, and, when the shingles are assembled, the outer end of the clip is forced through the corner 80 of the overlying shingle and the projecting portion 88 of the clip is bent down onto the top of the corner 80, thus firmly holding the two strips of shingles together and locking the exposed corner 80 downward.

A modification of this method of locking consists in the use of a nail 90, which is passed into a recess 91 in the lug 77, with the shank of the nail projecting upwardly and, when the shingles are laid, the nail is forced through the corner 80 and the portion 92 of the nail is then bent over onto the top of the corner.

By combining these various definition lines in these various ways with the edges, to produce the figures desired, the shingle strips may be made materially wider with a given amount of lapping of the strips, as the lines take the places of the lapping edges of the ordinary manner of forming the figures and, hence, the width of the exposed portion of the strips may be substantially doubled, and the alternate lapping portions are thereby eliminated. As to the method of utilizing cellulose material such as duco, in the manufacture of building material, this is described and claimed in copending application Serial No. 483,310.

I claim as my invention:

1. A roofing element comprising a body portion having cuts extending inwardly from an edge to form a tongue, said tongue being bent over on the upper surface of the body to extend in a reverse direction from said edge of the body to form means for alining another roofing element of the next course which is laid over said bent over tongue and to form a portion of triple thickness with two roofing elements.

2. A roofing element comprising a body portion having cuts extending inwardly from an upper edge to form a tongue, said tongue being bent over on the upper surface of the body to extend in a reverse direction from said upper edge to form means for alining another roofing element of the next course which is laid over said bent over tongue and to form a portion of triple thickness with two roofing elements.

3. A roofing element comprising a body portion having cuts formed therein to produce a tongue, said tongue being bent over on the upper surface of the body to extend in a reverse direction from the portions adjacent the cuts, said body portion also having locking means in connection therewith for interlocking with the tongue of an element below, said tongue of the element below being under the element in the next course above.

4. A roofing element comprising a body portion having cuts formed therein to produce a tongue, said tongue being bent over on the upper surface of the body to extend in a reverse direction from the portions adjacent the cuts, said body portion also having a locking cut in connection therewith for interlocking with the tongue of an element below, said tongue of the element below being under the element in the next course above.

5. A roofing element comprising a body portion having a tab in connection with its lower edge, said body having cuts extending inwardly from its upper edge to form a tongue, said tongue being bent over in a reverse direction from said upper edge and toward the tab, the lower end of the tongue being located to position the tab of an element above in proper relation to the top of the element below to produce a desired configuration on the roof.

6. A plurality of shingles assembled on a roof in overlapping courses, said shingles comprising a body portion having alternating tabs and recesses depending from the lower edge thereof, the upper portion of the body being provided with tongues cut from said upper portion and bent to extend in a reverse direction from said upper portion of the body, said tongues being spaced apart a distance equal to the distance between the lower portions of the tabs, and each tongue therefore being positioned below a tab of a shingle of the course above to form an extra thickness below said tab, the tongues also insuring proper alignment of the shingles in one course with respect to the shingles of an adjacent course.

7. A plurality of shingles assembled on a roof in overlapping courses, said shingles comprising a body portion having alternating tabs and recesses depending from the lower edge thereof, the upper portion of the body being provided with tongues bent to extend in a reverse direction from said upper portion of the body, said tongues being spaced apart a distance equal to the distance between the lower portions of the tabs, each tongue therefore being positioned below a tab of a shingle of the course above to form an extra thickness below said tab, the tongues also insuring proper alignment of the shingles in one course with respect to the shingles of an adjacent course.

8. A plurality of shingles assembled on a roof in overlapping courses, said shingles comprising a body portion having alternating tabs and recesses depending from the lower edge thereof, the upper portion of the body being provided with tongues cut from said upper portion and bent to extend in a reverse direction from said upper portion of the body, said tongues being spaced apart a distance equal to the distance between the lower portions of the tabs, the lower edges of the tongues being substantially equal in length to the lower edges of the tabs and coinciding with said lower edges of the tabs of shingles in the course above to provide an extra thickness and to insure proper alignment.

9. A plurality of shingles assembled on a roof in overlapping courses, said shingles comprising a body portion having alternating tabs and recesses depending from the lower edge thereof, the upper portion of the body being provided with tongues cut from said upper portion and bent to extend in a reverse direction from said upper portion of the body, said tongues being spaced apart a distance equal to the distance between the lower portions of the tabs, the lower edges of the tongues being substantially equal in length to the lower edges of the tabs and coinciding with said lower edges of the tabs of shingles in the course above to provide an extra thickness and to insure proper alignment, locking means in connection with each tongue and complementary locking means in connection with each tab.

10. A plurality of shingles assembled on a roof in overlapping courses, said shingles comprising a body portion having alternating tabs and recesses depending from the lower edge thereof, the upper portion of the body being provided with tongues cut from said upper portion and bent to extend in a reverse direction from said upper portion of the body, said tongues being spaced apart a distance equal to the distance between the lower portions of the tabs, the lower edges of the tongues being substantially equal in length to the lower edges of the tabs and coinciding with said lower edges of the tabs of shingles in the course above to provide an extra thickness and to insure proper alignment, each tongue having a slot formed therein, and each tab having a pair of inwardly diverging cuts to form a section of material therebetween engageable with the slot of a tongue.

11. A plurality of shingles assembled on a roof in overlapping courses, said shingles comprising a body portion having alternating tabs and recesses depending from the lower edge thereof, the upper portion of the body being provided with tongues cut from said upper portion and bent to extend in a reverse direction from said upper portion of the body, said tongues being spaced apart a distance equal to the distance between the lower portions of the tabs, the lower edges of the tongues being substantially equal in length to the lower edges of the tabs and coinciding with said lower edges of the tabs of shingles in the course above to provide an extra thickness and to insure proper alignment, each tongue having a slit formed therein, and each tab having an angularly extending slit engageable with the slit in a tongue.

12. In a roofing surface, shingle elements assembled in courses with shingles in the same course in non-overlapping position and having flexible members of similar shingle material overlying and connecting to their body portions, said members having a free end projecting downwardly and having a portion that will retard the upward movement of a receiving means at a desired point, said receiving means being a slot positioned between and adjacent the vertex of the converging edges of a weather-exposed portion of elements in the overlying course, said members and receiving means having the property of aligning and locking down said weather-exposed portions.

13. In a roofing surface, shingle elements assembled in courses with shingles in the same course in non-overlapping position and having members of similar flexible shingle material overlying and connected to their body portions, and having their free ends projecting downwardly, said members being engageable with receiving means adjacent the butt edges of the weather exposed portions of shingles in the overlying course, said members and receiving means having the property of aligning and locking down said weather exposed portions.

14. In a roofing assembly, shingle elements having overlying members of similar flexible shingle material connected to their body portions, said members having a free end projecting downwardly with a slot therein to retard the downward movement of a tab, said tab being located adjacent the butt edge of the weather exposed portion of shingle elements in an overlying course, said slot and tab having the property of aligning and locking down said weather exposed portion.

15. In a roofing surface, shingle elements assembled in courses and having members of similar flexible shingle material in position thereon and projecting downwardly and outwardly from suitable openings formed by a series of cut edges within and adjacent an edge of the shingle weather exposed portions, each element having one of said members with its edges substantially within the bounding edges of said element, and having its lower portion exposed to the weather and its remaining portion underlying the element through which it projects, and each member having a portion that will retard its outward and downward movement from its receiving means.

16. In a roof covering, overlapping shingles, the overlapped shingle having an opening completely surrounded by a wall formed by the material of the shingle and the overlapping shingle provided with a lock tongue having at least one edge at an angle to the horizontal and entered through said opening to lie underneath said overlapped shingle adjacent said opening.

17. In a roof covering, overlapping shingles, the overlapped shingle having an opening completely surrounded by a wall formed by the material of the shingle and the overlapping shingle provided with a lock tongue at the edge of the overlapping portion thereof inclined to the horizontal and entered through said opening to lie underneath said overlapped shingle adjacent said opening.

18. In a roof covering, overlapping shingles, the overlapped shingle having an opening completely surrounded by a wall formed by the material of the shingle and the overlapping shingle provided with a lock tongue spaced inwardly from the bounding edges thereof and having at least one edge at an angle to the horizontal and entered through said opening to lie underneath said overlapped shingle adjacent said opening.

19. In a roof covering, overlapping shingles, each shingle having an opening completely surrounded by a wall formed by the material of the shingle and having a lock tongue within the bounding edges of the shingle and in transverse alignment with said opening, said shingles assembled with the locking tongue of one shingle entered through the opening of an underlying shingle to lie underneath said overlapped shingle adjacent said opening.

NORMAN P. HARSHBERGER.